United States Patent
Balconi et al.

(10) Patent No.: US 7,807,091 B2
(45) Date of Patent: Oct. 5, 2010

(54) METHOD AND PLANT FOR THE INTRODUCTION OF A LIQUID INTO A MOLTEN MASS UNDER PRESSURE

(75) Inventors: Luca Balconi, Milan (IT); Gaia Dell'Anna, Milan (IT); Alberto Bareggi, Milan (IT); Sergio Belli, Milan (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 654 days.

(21) Appl. No.: 10/577,349

(22) PCT Filed: Oct. 31, 2003

(86) PCT No.: PCT/IT03/00704

§ 371 (c)(1),
(2), (4) Date: Feb. 26, 2007

(87) PCT Pub. No.: WO2005/042226

PCT Pub. Date: May 12, 2005

(65) Prior Publication Data

US 2007/0248748 A1    Oct. 25, 2007

(51) Int. Cl.
*B29C 45/18*    (2006.01)
*H01B 13/14*    (2006.01)

(52) U.S. Cl. ............... 264/349; 427/118; 264/40.3; 264/171.13; 264/171.14; 425/130; 239/304

(58) Field of Classification Search ........... 264/349, 264/169, 171.14, 171.13; 239/304; 169/13–14
See application file for complete search history.

(56) References Cited

U.S. PATENT DOCUMENTS 3,968,463 A * 7/1976 Boysen .................. 333/243

(Continued)

FOREIGN PATENT DOCUMENTS

EP    0 161 857 A2    11/1985

(Continued)

OTHER PUBLICATIONS

V.V. Serebrennikov et al.; "Operator's Handbook of Pumping and Compressing Plants", Air Collector, pp. 139-142, (1970).

(Continued)

*Primary Examiner*—Jennifer K Michener
*Assistant Examiner*—Magali P Slawski
(74) *Attorney, Agent, or Firm*—Finnegan, Henderson, Farabow, Garrett & Dunner, L.L.P.

(57)    ABSTRACT

A method and plant for the introduction of a liquid into a molten mass under pressure. Such a method and plant are particularly, but not exclusively, suitable for the formation of a coating layer on a cable element having at least one conductor, the layer having an extruded thermoplastic polymer forming a continuous phase incorporating a dielectric liquid, and are useful, for example, in the production of an electric cable for the transportation and/or distribution of electrical power. The method includes the steps of bringing the liquid to a predetermined pressure greater than the pressure of the molten mass; feeding the liquid into a plurality of storage tanks, and injecting the liquid into the molten mass at an injection pressure equal to the above-mentioned predetermined pressure by means of a plurality of injectors in respective fluid communication with the plurality of storage tanks. Advantageously, this allows a substantial continuity of delivery of the liquid in a technologically simple way and at low cost, while ensuring a dispersion as uniform as possible of the liquid within the molten mass.

16 Claims, 2 Drawing Sheets

U.S. PATENT DOCUMENTS

| | | | | |
|---|---|---|---|---|
| 4,107,354 | A | * | 8/1978 | Wilkenloh et al. .......... 427/118 |
| 4,877,568 | A | * | 10/1989 | Austin .................... 264/211.21 |
| 4,961,845 | A | * | 10/1990 | Dawson et al. ............. 204/663 |
| 6,220,224 | B1 | * | 4/2001 | Matthies et al. ............ 123/468 |
| 6,884,823 | B1 | * | 4/2005 | Pierick et al. ................. 521/79 |
| 2002/0167103 | A1 | | 11/2002 | Ickinger |
| 2004/0011193 | A1 | * | 1/2004 | Moe et al. ..................... 91/491 |
| 2004/0091631 | A1 | * | 5/2004 | Belli et al. ............... 427/430.1 |

FOREIGN PATENT DOCUMENTS

| | | |
|---|---|---|
| EP | 0 611 250 A1 | 8/1994 |
| JP | 39-014092 | 7/1939 |
| JP | 54-178779 | 12/1979 |
| JP | 62-299322 | 12/1987 |
| WO | WO-99/13477 | 3/1999 |
| WO | WO-02/47092 A1 | 6/2002 |

OTHER PUBLICATIONS

Office Action issued on Jul. 3, 2009 by the Japan Patent Office in corresponding Japanese Patent Application No. 2005-510125.

English language translation of Office Action issued on Jul. 3, 2009 by the Japan Patent Office in corresponding Japanese Patent Application No. 2005-510125.

* cited by examiner

METHOD AND PLANT FOR THE INTRODUCTION OF A LIQUID INTO A MOLTEN MASS UNDER PRESSURE

CROSS REFERENCE TO RELATED APPLICATION

This application is a national phase application based on PCT/IT2003/000704, filed Oct. 31, 2003, the content of which is incorporated herein by reference.

DESCRIPTION

1. Field Of The Invention

In a first aspect thereof, the present invention relates to a method for the introduction of a liquid into a molten mass under pressure.

In the present description and in the subsequent claims, the term "liquid" is used to indicate a homogeneous or heterogeneous product comprising at least one liquid component, such as for example a heterogeneous mixture of at least one solid component dispersed in at least one liquid, which product is able to flow in a circulation circuit without causing precipitates to an extent such as to clog the circuit or in any case such as to jeopardise the operation thereof by excessively decreasing the flow rate of the product. In the case of a solid-liquid heterogeneous mixture, in other words, the solid component is present in an amount such as not to substantially alter the fluidodynamic properties of the liquid component and such as not involve excessive precipitation phenomena.

In a second aspect thereof, the present invention relates to a plant for the introduction of a liquid into a molten mass under pressure.

For illustrative purposes, conditions of molten mass subjected to pressure (typically greater than at least about 10 bar) may be found, for example, in the extrusion process of a coating layer of a cable for the transportation and/or distribution of electrical power of the so-called low voltage type (where low voltage indicates a voltage lower than about 1 kV), medium voltage type (where medium voltage indicates a voltage from about 1 kV to about 30 kV) or high voltage type (where high voltage indicates a voltage greater than about 30 kV).

For illustrative purposes, the above-mentioned coating layer may be the insulating layer and/or one or both the semi-conductive layers arranged in a radially inner and, respectively, outer position with respect to the insulating layer of the electric cable.

In the case in which the coating layer is the insulating layer, the coating layer is deposited either onto a conductor or onto a semi-conductive layer coating the conductor in a radially outer position with respect to the latter. With reference to the insulating layer, this may, for example, consist either of an extruded thermoplastic polymer forming a continuous phase incorporating a dielectric liquid or of an extruded polymer, for example radically cross-linked by addition of an organic peroxide. With reference to the semi-conductive layers, these may have the same composition as the above insulating layer and further include a suitable conductive filler in order to confer the layer the desired semi-conductive function.

2. Prior Art

Electrical cables for the transportation and/or distribution of power are known, which cables are provided with at least one coating layer, for example made of insulating material, of the extruded non-cross-linked type comprising a thermoplastic polymer and a liquid, such as for example a dielectric liquid suitable for conferring the layer of insulating material adequate electrical properties—in particular dielectric rigidity—.

In the case in which the coating is of the insulating type and the liquid is a dielectric liquid, one of the requirements to be met is notoriously that of uniformly distributing the dielectric liquid through the whole thickness of the insulating coating of an electrical cable for the transportation and/or distribution of medium and/or low voltage electrical power. If the dielectric liquid is not distributed uniformly through the polymeric mass, in fact, the resulting cable has zones having a lower potential with respect to what has been planned, i.e. zones in which the dielectric rigidity is lower than that desired, such zones thus becoming possible sites of striking of electric discharges. Furthermore, a non-uniform distribution of the dielectric liquid in the polymeric mass involves a non-uniform distribution also of the anti-oxidant agents normally present in the dielectric liquid. In such a case, therefore, the cable is more subject to phenomena of ageing and is not able to ensure a substantial constancy of performance in time, and thus the desired reliability, particularly at high operative temperatures (typically greater than about 80-90° C.).

Patent application WO 99/13477 discloses a coating layer of a cable made of insulating material consisting of a thermoplastic polymer forming a continuous phase incorporating a dielectric liquid, which forms an interpenetrating phase mobile in the solid polymeric structure. The weight ratio between the thermoplastic polymer and the dielectric liquid is between 95:5 and 25:75. The insulating material may be produced by a method which provides the step of hot mixing a mass of thermoplastic polymer and the dielectric liquid in a discontinuous or continuous manner, for example by means of an extruder. In particular, after a hot mixing step of such a polymer with such a liquid, the resulting mixture is cooled, granulated at room temperature and introduced into an extruder. A layer of insulating material arranged in a radially outer position with respect to the radially inner semi-conductive layer is thus produced by extrusion. The layer of insulating material is subsequently coated by a radially outer semi-conductive layer, by a metal screen and by an outer sheath to complete the electric cable.

The material of which the polymeric mass consists may be used both in thermoplastic form and in cross-linked form. Among the thermoplastic polymers the following polymers are indicated: polyolefins, acetate polymers, cellulose. polymers, polyesters, polyketones, polyacrylates, polyamides and polyamines. In particular, the use of polymers having low crystallinity is suggested. The dielectric liquid is preferably a synthetic or mineral oil, having low or high viscosity, in particular a polyisobutylene, naphtenic, polyaromatic, alpha-olefin or silicone oil.

Patent application WO 02/47092 discloses a method for producing a cable with at least one polymeric coating layer including a dielectric liquid. Such a cable is obtained by a method which provides the extrusion of a mass of thermoplastic material comprising a thermoplastic polymer mixed with a dielectric liquid, and the subsequent passage of the thermoplastic material added with the dielectric liquid by means of a static mixer.

Patent application US 2002/0167103 discloses a method and a plant for introducing a liquid additive, such as for example a hardener, a dye, a softener, a filler or a reinforcing additive, into a molten mass consisting of a fluid medium under pressure, such as for example a molten thermoplastic material. In particular, in accordance with a preferred embodiment described by such patent application, the liquid is brought to a predetermined pressure greater than the pressure of the molten thermoplastic mass, is then fed into a line for feeding the liquid and from here is stored in a storage tank under pressure in fluid communication with the line for feeding the liquid. Finally, the liquid is injected into the molten thermoplastic mass at an injection pressure equal to the above-mentioned predetermined pressure. In particular, the mass is received in an extruder and the liquid is injected therein by means of a plurality of injectors driven electronically by a servo-controlled electronic drive system. The introduction of the liquid into the molten thermoplastic mass under pressure therefore takes place by injection and allows a nebulisation of the liquid and a consequent effective mixing action between this and the molten mass. Furthermore, due to the presence of the storage tank, a decoupling between the generation of pressure and the injection of the liquid is obtained, with an ensuing damping of the oscillations of the pressure of the liquid to be injected.

Despite the achievement of such effects, the method and the plant disclosed in patent application US 2002/0167103 suffer from a number of drawbacks, such as for example the complexity and the cost of the servo-controlled electronic drive system, which is essential to ensure a continuous delivery of the liquid by means of the injectors.

SUMMARY OF THE INVENTION

In order to overcome the drawbacks of the prior art described above, the Applicant has identified the need of providing a method and a plant for the introduction of a liquid into a molten mass under pressure which are able to ensure a substantial continuous delivery and introduction of the liquid into the molten mass in a technologically simple way and at low costs, while ensuring a dispersion as uniform as possible of the liquid within the molten mass under pressure.

In the present description and in the subsequent claims, the expression "substantial continuous delivery and introduction of a liquid into a molten mass under pressure" is used to indicate the fact that the liquid is delivered or, respectively, introduced into the molten mass without appreciable interruptions. For example, the time range elapsed between two successive deliveries by the same injector is generally lower than a few tenths of a second.

The Applicant has found that it is possible to introduce a liquid into a molten mass under pressure, generally from about 10 bar to about 1400 bar, in a substantial continuous manner by feeding the liquid to a plurality of storage tanks, preferably under pressure, and by injecting the liquid at an injection pressure greater than the pressure of the molten mass, preferably at an injection pressure from about 30 bar to about 1500 bar.

In other words, the Applicant has found that it is possible to ensure the introduction of a liquid into a molten mass under pressure in a substantially continuous manner and without the need of providing complex and expensive driving means thanks to the provision of at least two storage tanks under pressure and of at least as many injectors, i.e. not just by making the step of forming the pressure of the liquid and the step of injecting the liquid independent from each other (for which effect it would be sufficient to provide a single storage tank), but by making also the at least two injectors independent from each other.

In accordance with a first aspect thereof, the present invention refers, therefore, to a method for the introduction of a liquid into a molten mass under pressure, which method comprises the steps of:

a) bringing said liquid to a predetermined pressure greater than the pressure of said molten mass;

b) feeding said liquid to a plurality of storage tanks;

c) injecting said liquid into said mass at an injection pressure greater than said predetermined pressure by means of a plurality of injectors in respective fluid communication with said plurality of storage tanks.

Thanks to the fact that the liquid to be injected into the molten mass under pressure is stored in a plurality of storage tanks prior to the step of injecting the liquid itself, the step of forming the pressure of the liquid to be introduced into the molten mass and the step of injecting the liquid into the molten mass are independent, which advantageously allows the liquid to be injected into the molten mass at high pressures, for example in the order of 700 bar or greater, depending on the value of pressure to which the molten mass is subjected.

At such values of injection pressure of the liquid, this is advantageously subjected to nebulisation, i.e. finely dispersed in the form of small droplets, with advantageous improvement of the subsequent mixing step of the liquid with the molten mass, mixing step which is provided in accordance with a preferred embodiment of the method of the invention described in greater detail hereafter.

Furthermore, thanks to the provision of a plurality of liquid storage tanks acting as reservoirs of liquid under pressure to be introduced in the molten mass and to the provision of a corresponding plurality of injectors in respective fluid communication therewith, it is advantageously possible to introduce the liquid into the molten mass under pressure in a substantially continuous and well metered manner, without the need of providing sophisticated driving means such as the driving means of the electronic type employed in the plant disclosed in patent application US 2002/0167103. The method and the plant disclosed in patent application US 2002/0167103, in fact, can only work thanks to the provision of a drive system of the electronic type. Should such drive system of the electronic type be replaced by a less complex drive system of the mechanical type based upon a simple calibration at a predetermined threshold pressure, the injectors would all feel the same pressure and, consequently, at a given time they would all be open or all closed depending on the fact that the value of the pressure of the liquid stored in the storage tank is greater or, respectively, lower than the value of the predetermined threshold pressure, with a possible lack of delivery of the liquid in some time ranges and an interruption of the continuity of the process of injecting the liquid into the thermoplastic mass and, therefore, with an ensuing insufficient and non-homogeneous distribution of the liquid additive in the molten mass under pressure. The method and the plant of the present invention, on the other hand, thanks to the presence of a plurality of storage tanks under pressure, advantageously allow to drive the injection of the liquid in a technologically simple way, for example mechanically by means of the use for each injector, in accordance with a preferred embodiment of the method of the invention, of a spring calibrated at a predetermined threshold pressure greater than the pressure to which the molten mass under pressure is subjected. Furthermore, thanks to the provision of a step of injecting the liquid by means of a plurality of injectors independent from each other, the method of the invention allows that the liquid pressure within at least one storage tank of said plurality of storage tanks is greater than a predetermined threshold pressure in a substantial continuous manner. In such a way, substantially at each moment, at least one injector is in the operative condition of injecting liquid into the molten mass.

The weight ratio between the liquid and the above-mentioned molten mass is preferably from about 1:99 to about 25:75, more preferably from about 2:98 to about 20:80 and, still more preferably, from about 3:97 to about 15:85.

In accordance with a preferred embodiment of the method of the invention, the above-mentioned liquid is a dielectric liquid which advantageously confers the mass, for example polymeric, the required dielectric rigidity, a property particularly desired in the case in which the mass incorporating the dielectric is intended to form a coating layer of an electric cable. Furthermore, thanks to the chemical-physical properties thereof, the dielectric liquid exerts an advantageous self-lubricating action along the whole circuit through which the liquid flows.

In particular, therefore, a preferred embodiment of the invention provides the introduction of a dielectric liquid into the molten mass under pressure in order to make a coating layer of an electric cable for the transportation and/or the distribution of low, medium or high voltage electric power, said layer preferably comprising a polymer, more preferably a thermoplastic polymer, forming a continuous phase incorporating the dielectric liquid.

The above-mentioned coating layer may be either the insulating layer of the cable or, by adding a suitable conductive filler, one of or both semi-conductive layers arranged in a radially inner and, respectively, outer position with respect to the insulating layer of the cable.

For example, the dielectric liquid may be selected from the group comprising: mineral oils, such as for example aliphatic (for example paraffinic) oils, naphtenic oils, aromatic oils, polyaromatic oils, mixed aliphatic and aromatic oils, said mineral oils optionally containing at least one heteroatom selected from oxygen, nitrogen and sulphur; liquid paraffines; vegetable oils, such as for example soybean oil, linseed oil, castor oil; oligometric aromatic polyolefins; paraffinic waxes, such as for example polyethylene waxes, polypropylene waxes; synthetic oils, such as for example silicone oils, alkyl benzenes (for example dibenzyltoluene, dodecylbenzene, dioctylbenzyltoluene), aliphatic esters (for example tetraesthers of pentaerythrol, esthers of sebacic acid, phthalic esthers), olefin oligomers (for example optionally hydrogenated polybutenes or polyisobutenes); and mixtures thereof.

Aromatic, paraffinic and naphtalenic oils are particularly preferred.

The dielectric liquid preferably used in carrying out the present invention is an aromatic and/or aliphatic oil, preferably having a dielectric constant less than or equal to 8 and, more preferably, less than 3.5. Such preferred values of the dielectric constant refer to a dielectric constant measured at 25° C. according to standard IEC 247 (1978 Edition).

Preferably, the dielectric liquid is selected from the group comprising:

(i) an alkylaryl hydrocarbon having at least two, preferably at least three, non-fused aromatic rings with a ratio between the number of aryl carbon atoms and the total number of carbon atoms greater than or equal to 0.6, preferably greater than or equal to 0.7, as described in European patent application EP 1 295 301 in the name of the Applicant;

(ii) a diphenyl ether, unsubstituted or substituted with at least one linear or branched hydrocarbon radical, having from 1 to 30 carbon atoms, preferably from 1 to 24 carbon atoms, as described in patent application WO 02/27731 in the name of the Applicant;

(iii) a mixture of (i) and (ii).

Still more preferably, the dielectric liquid comprises at least one alkylaryl hydrocarbon having at least three non-fused aromatic rings in an amount of not less than 10% by weight, with respect to the total weight of the dielectric liquid.

Examples of alkylaryl hydrocarbons belonging to class (i) which can be used according to the present invention are: benzyltoluene, benzylxylene, (methylbenzyl)toluene, (methylbenzyl)xylene, dibenzyltoluene, dibenzylxylene, di(methylbenzyl)toluene, di(methylbenzyl)xylene, and the like, or mixtures thereof.

Examples of diphenyl ethers belonging to class (ii) which can be used according to the present invention are: phenyl toluyl ether, 2,3'-ditoluyl ether, 2,2'-ditoluyl ether, 2,4'-ditoluyl ether, 3,3'-ditoluyl ether, 3,4'-ditoluyl ether, 4,4'-ditoluyl ether, octadecyl diphenyl ether, and the like, or mixtures thereof.

The dielectric liquid preferably used to carry out the method of the present invention has a predetermined viscosity, such as to avoid a quick diffusion of the liquid through the molten mass under pressure and thus an outwards migration thereof, and at the same time such as to ensure the liquid to be easily fed and mixed in the polymeric material. Preferably, the dielectric liquid has a kinematic viscosity, measured at 20° C. according to standard ISO 3104 (ISO 3104/AC1 of July 1997), from about 1 to about 500 mm$^2$/s, more preferably from about 5 to about 100 mm$^2$/s.

According to a further preferred embodiment of the invention, the dielectric liquid has a hydrogen-absorbing capacity, measured according to standard IEC 628 (12th Edition of 1985), greater than or equal to about 5 mm$^3$/min, more preferably greater than or equal to about 50 mm$^3$/min.

Preferably, to the dielectric liquid suitable for carrying out the method of the present invention, an epoxy resin may be added, preferably in an amount lower than or equal to 1% by weight with respect to the weight of the liquid, which resin is considered to carry out the main function of reducing the migration speed of the ions under an electric field, and therefore the dielectric losses of the insulating material.

In order to carry out the method according to the invention, when the mass comprises a polymeric material, other conventional components may be added to this material, such as for example anti-oxidants aimed at counteracting undesired phenomena of ageing of the mass, processing adjuvants, water tree retardant additives, and the like.

Conventional anti-oxidants suitable for the purpose are, for example, distearyl-thiopropionate and pentaerythryl-tetrakis [3-(3,5-di-tert-butyl-4-hydroxy phenyl)propionate]and the like, or mixtures thereof.

Processing adjuvants which can be added to the polymeric base are, for example, calcium stearate, zinc stearate, stearic acid, paraffinic wax, and the like, or mixtures thereof.

In the case in which a semi-conductive layer has to be made, a conductive filler is dispersed in the polymeric material, such as for example carbon black, in an amount such as to impart semi-conductive characteristics to the polymeric material, i.e. so as to obtain a resistivity lower than 5 Ohm·m at room temperature. Such amount is preferably comprised between about 5% and about 80% by weight, more preferably between about 10% and about 50% by weight, with respect to the total weight of the mixture.

When the same type of polymeric material is used both for the insulating layer and for the semi-conductive layers, an advantage in the production of medium or high voltage cables is accomplished, since the use of the same type of polymeric material ensures an optimal adhesion between the adjacent layers and therefore a better electric behaviour particularly at the interface between the insulating layer and the inner semi-conductive layer, where the electric field and therefore the risk of partial discharges are higher.

Although the present description is mainly focused upon the manufacture of cables for the transportation and/or the distribution of medium or high voltage electric power, the method according to the present invention may be carried out to manufacture the insulating coating of electrical devices in general. In particular, the method may be carried out to manufacture different types of cable, such as for example low voltage cables, telecommunications cables, mixed power/telecommunication cables, or to manufacture components of accessories used in the manufacture of electric lines, such as for example elastic sleeves for terminals or joints.

According to a preferred embodiment of the method of the present invention, the molten mass under pressure comprises at least one polymer, such as for example a thermoplastic polymer and, more preferably, such thermoplastic polymer comprises at least one polyolefin in molten state and under pressure.

Preferably, such polyolefin has a flexural elastic modulus, measured according to standard ASTM D790-91 at room temperature, from about 30 to about 1400 MPa, more preferably from about 60 to about 1000 MPa.

Preferably, the above-mentioned polyolefin has a melt flow index (MFI), measured at 230° C. with a load of 21.6 N according to standard ASTM D1238-90b (of December 1990), from about 0.05 to about 10.0 dg/min, more preferably from about 0.5 to about 5.0 dg/min.

Polyolefins suitable for the purpose may preferably be selected from the group comprising:

(a) a high density polyethylene (HDPE), having a density generally comprised between about 0.93 g/cm$^3$ and about 0.96 g/cm$^3$;

(b) a propylene homopolymer or a propylene copolymer with at least one olefin comonomer selected from the group comprising ethylene and an α-olefin other than propylene, said homopolymer or copolymer having a melting point greater than or equal to about 140° C., preferably comprised between about 145° C. and about 170° C., and a melting enthalpy from about 30 to about 100 J/g, preferably from about 30 to about 85 J/g.

In the case in which a propylene copolymer with an olefin comonomer is used, the latter is preferably present in an amount lower than or equal to about 15% mol, more preferably lower than or equal to about 10% mol. The olefin monomer is preferably either ethylene or α-olefin of formula $CH_2=CH-R$, where R is an alkyl, linear or branched, having from 2 to 10 carbon atoms, selected, for example, from the group comprising: 1-butene, 1-pentene, 4-methyl-1-pentene, 1-esene, 1-octene, 1-decene, 1-dodecene, and the like, or combinations thereof. Propylene/ethylene copolymers are particularly preferred.

According to a particularly preferred embodiment of the method of the invention, the thermoplastic polymer is a polyolefin selected from the group comprising:

(1) a propylene homopolymer or a propylene copolymer with at least one olefin comonomer selected from the group comprising ethylene and an α-olefin other than propylene, having a flexural elastic modulus preferably comprised between about 30 and about 900 MPa, more preferably between 50 and 400 MPa;

(2) a heterogeneous copolymer comprising a propylene-based thermoplastic phase and a copolymerised ethylene-based elastomeric phase with an α-olefin, preferably with propylene, wherein the elastomeric phase is present in an amount of at least 45% by weight with respect to the total weight of the heterogeneous copolymer.

The homopolymers or copolymers falling within class (1) show a monophasic microscopic structure, i.e. substantially without heterogeneous phases dispersed in molecular domains of size greater than one micron. Such materials, in fact, do not undergo optical phenomena typical of heterogeneous polymeric materials, and in particular such materials are characterised by greater transparency and a reduced stress whitening of the material due to localised mechanical stresses.

Within the above class (1), a propylene homopolymer or a propylene copolymer with at least one olefin comonomer selected from ethylene and an α-olefin other than propylene is particularly preferred, said homopolymer or copolymer having:

a melting point from about 140° C. to about 165° C.;
a melting enthalpy from about 30 J/g to about 80 J/g;
a fraction soluble in boiling diethyl ether in an amount lower than or equal to about 12% by weight, preferably comprised between about 1% and about 10% by weight, having a melting enthalpy lower than or equal to about 4 J/g, preferably lower than or equal to about 2 J/g;
a fraction soluble in boiling n-heptane in an amount comprised between about 15% and about 60% by weight, preferably between 20% and about 50% by weight, having a melting enthalpy from about 10 J/g to about 40 J/g, preferably from about 15 J/g to about 30 J/g; and
a fraction unsoluble in boiling n-heptane in an amount comprised between about 40% and about 85% by weight, preferably between about 50% and about 80% by weight, having a melting enthalpy greater than or equal to about 45 J/g, preferably from about 50 J/g to about 95 J/g.

Further details on these materials and on the use thereof for the coating of cables are reported in European patent application EP 1 230 647 in the name of the Applicant.

Heterogeneous copolymers falling within class (2) are thermoplastic elastomers obtained by block copolymerisation of: (i) propylene, optionally containing smaller quantities of at least one olefin comonomer selected from ethylene and an α-olefin other than propylene, and then of: (ii) a blend of ethylene with an α-olefin, in particular propylene, and optionally with smaller portions of a diene. This class of products is also commonly known with the term of "reactor thermoplastic elastomers".

Within the above class (2), particularly preferred is a heterogeneous copolymer in which the elastomeric phase consists of an elastomeric copolymer between ethylene and propylene which comprises from about 15% to about 50% by weight of ethylene and from about 50% to about 85% by weight of propylene with respect to the weight of the elastomeric phase. Further details on these materials and on the use thereof for the coating of cables are shown in patent application WO 00/41187, in the name of the Applicant.

Products of class (1) are commercially available, for example, under the trademark Rexflex® from Huntsman Polymer Corp.

Products of class (2) are commercially available, for example, under the trademark Hifax® from Montell.

The base thermoplastic polymer as described above may be used in mechanical blend with a polymer having low crystallinity, generally with a melting enthalpy lower than about 30 J/g, which exerts the main function of increasing the flexibility of the material. The amount of polymer having low crystallinity is preferably lower than about 70% by weight, more preferably comprised between about 20% and about 60% by weight, with respect to the total weight of the thermoplastic material.

Preferably, the polymer having low crystallinity is an ethylene copolymer with an α-olefin having from 3 to 12 carbon atoms, and optionally with a diene. Preferably the α-olefin is selected from the group comprising: propylene, 1-hexene and octene. In the case in which a diene comonomer is present, this generally has from 4 to 20 carbon atoms, and is preferably selected from the group comprising: conjugated or non-conjugated linear diolefins, such as for example 1,3-butadiene, 1,4-hexadiene, or 1,6-octadiene, and the like or mixtures thereof; monocyclic or polycyclic dienes, such as for example 1,4-cyclohexadiene, 5-ethylidene-2-norbornene, 5-methylene-2-norbornene, 5-vinyl-2-norbornene, and the like or mixtures thereof.

Among the particularly preferred ethylene copolymers there are:

(i) copolymers having the following monomeric composition: 35-90% mol of ethylene; 10-65% mol of an a-olefin, preferably propylene; 0-10% mol of a diene, preferably 1,4-hexadiene or 5-ethylidene-2-norbornene (EPR and EPDM rubbers fall within such a class);

(ii) copolymers having the following monomeric composition: 75-97% mol, preferably 90-95% mol, of ethylene; 3-25% mol, preferably 5-10% mol, of an α-olefin; 0-5% mol, preferably 0-2% mol, of a diene (such as for example ethylene/octene copolymers, such as for example the products Engage® from Dow-DuPont Elastomers).

In accordance with an alternative embodiment of the method of the invention, the liquid is an organic peroxide (such as for example dicumyl peroxide) intended to radically cross-link an extruded polymer.

In such a way, it is advantageously possible to produce a coating layer of an electric cable for the transportation and/or the distribution of low, medium or high voltage electrical power in a substantially continuous manner, in which such a coating layer consists of an extruded polymer incorporating the organic peroxide for the subsequent radical cross-linking of the polymer. Preferably, in the case in which a cross-linking step is provided after the extrusion step, the cross-linked polymeric material is preferably polyolefin-based, in particular cross-linked polyethylene (XLPE) or ethylene/propylene elastomeric copolymers (EPR) or ethylene/propylene/diene (EPDM), which are also cross-linked.

In accordance with a preferred embodiment of the method of the invention, the pressure of the molten mass is comprised between about 10 bar and about 1400 bar.

Preferably, the above-mentioned step a) of bringing the liquid to a predetermined pressure greater than the pressure of the molten mass is carried out by means of at least one pump, more preferably a reciprocating positive-displacement pump comprising a plurality of pumping units, for example piston units, in respective fluid communication with a plurality of storage tanks under pressure, preferably through a respective plurality of lines for feeding the liquid.

In such a way, by acting upon the number of revolutions of the pump and/or upon the position of the acceleration device which allows to vary the amount of liquid entering the pumping units, it is advantageously possible to carry out the method of the invention in a wide variety of applications, which are variable as a function of the nature and of the viscosity of the liquid to be introduced into the polymer.

In accordance with a preferred embodiment of the method of the invention, the step of staggering the above-mentioned pumping units may be provided in such a manner that the liquid is pumped by the different pumping units at distinct moments depending on the application requirements.

In accordance with a preferred embodiment of the method of the invention, the above-mentioned step b) of feeding the liquid is carried out by feeding the liquid to each storage tank of the plurality of storage tanks under pressure through at least one pair of lines for feeding the liquid. In other words, the feeding lines are preferably grouped in pairs and each pair of feeding lines is associated with a respective storage tank. Each storage tank is therefore preferably provided with two inlets in fluid communication with a corresponding pair of feeding lines and with at least one outlet in fluid communication with at least one injector. In such a way, it is advantageously possible to group the pumping units of the pump in pairs, which allows that the two pistons belonging to the grouped pumping units, acting at the same time, feed the storage tanks even when the pressure of the liquid drops. Consequently, there is always a sufficient amount of liquid in the storage tanks for the subsequent injection, which allows to ensure a substantially continuous delivery and a subsequent substantially continuous introduction of liquid into the molten mass.

Preferably, the above-mentioned step c) of injecting the liquid into the molten mass is carried out at an injection pressure comprised between about 30 bar and about 1500 bar when the molten mass is subjected to a pressure comprised between about 10 bar and about 1400 bar, at an injection pressure comprised between about 400 bar and about 1000 bar when the molten mass is subjected to a pressure comprised between about 300 bar and about 900 bar and at an injection pressure comprised between about 500 bar and about 750 bar when the molten mass is subjected to a pressure comprised between about 400 bar and about 650 bar.

Preferably, step c) of injecting the liquid into the molten mass under pressure is driven mechanically.

Thanks to such a feature, the opening of each injector is advantageously driven in a simple and cost-effective manner, in such a way that the liquid is introduced into the molten mass under pressure when the pressure of the liquid in a given storage tank under pressure exceeds a predetermined threshold pressure, greater than the pressure to which the molten mass is subjected and preferably such as to allow the nebulisation of the liquid.

Preferably, step c) of injecting the liquid is carried out by means of a plurality of injectors of the mechanical type whose opening is driven by a spring calibrated at a predetermined threshold pressure equal to the desired injection pressure.

In accordance with an alternative embodiment of the method of the invention, the above-mentioned step c) of injecting the liquid is driven electronically, for example by providing a plurality of electrovalves, actuated by an electronic control unit suitable for driving electrovalves, in particular in order to set the moment and duration of opening thereof, on each storage tank.

Preferably, the method of the invention further comprises the step of mixing the liquid with the molten mass under pressure.

Preferably, the liquid is introduced into a polymeric molten mass under pressure and the step of injecting the liquid is carried out within an extruder in which the molten mass under pressure is received. In accordance with such a preferred embodiment of the method of the invention, the liquid is introduced into the polymeric mass by injection into the extruder, in a zone of the extruder where the polymeric mass is in molten state, i.e. is already plastified.

Preferably, the injection of the liquid takes place in an end zone of the extruder with respect to the path of the polymeric mass along the extruder. This solution allows both the mixing of the liquid with the molten mass in which the liquid is introduced due to the extrusion step, and the metering of the liquid accurately and the achievement of an optimal distribution of he latter within the polymer due to the fact that the mass is in a completely molten state in the end zone of the extruder.

Advantageously, at the same time, the addition of the liquid to the already plastified polymer does not affect the stability of the extrusion process. On the contrary, i.e. in the case in which the introduction of liquid is carried out in the first extrusion steps, when the polymer has not yet molten, there could be irregularities in the movement of the material within the extruder due to the lubricating action determined by the liquid.

Preferably, the above-mentioned step c) of injecting the liquid is carried out at a plurality of injection points angularly staggered by a predetermined angle in a zone of the extruder in which the mass is in molten state.

Alternatively or in combination with the above-mentioned angular staggering of the injection points, the above-mentioned step c) of injecting the liquid is carried out at a plurality of injection points longitudinally staggered by a predetermined distance in a zone of the extruder in which the mass is in molten state.

In other words, said longitudinally staggered injection points may belong to the same generatrix of the cylindrical surface defining the extruder body or to different generatrices of the cylindrical surface defining the extruder body.

In such a way, it is advantageously possible to introduce the liquid into the molten mass under pressure in at least two distinct points of the mass, suitably spaced apart, thus promoting the distribution of the liquid within the molten mass.

In accordance with a preferred embodiment, the method of the invention further comprises the preliminary step of filtering the liquid in order to take away possible polluting external agents present in the liquid which can, for example, cause the formation of precipitates capable of damaging the pumping devices and/or or clogging the circulation circuit of the liquid.

Preferably, the method further comprises the step of maintaining the liquid at a predetermined temperature, preferably between about 70° C. and about 80° C.

This preferred temperature range is in particular—even if not exclusively—suitable for the case in which the liquid is a dielectric liquid. Normally, in fact, the dielectric liquid comprises a mineral oil to which anti-oxidant substances or other additives in the form of solid powders at room temperature are added. In order to allow the melting of the anti-oxidant powders and to avoid an undesired subsequent precipitation thereof, the liquid is preferably preliminarily heated and subsequently maintained above the precipitation temperature of the anti-oxidant powders, preferably at a temperature within the above-mentioned preferred temperature range of 70-80° C.

In the case in which the liquid is a peroxide, in addition to the adding of anti-oxidant substances or in any case of substances which are in solid state at room temperature, the peroxide itself is solid at room temperature. Also in such a case, therefore, it is preferable to increase the temperature to maintain both the peroxide and the possible additives in liquid state.

Irrespective of the nature of the liquid to be introduced into the molten mass, the step of heating the liquid advantageously allows to decrease the viscosity of the liquid and therefore to improve the flow properties thereof.

In accordance with a second aspect thereof, the present invention refers to a plant for the introduction of a liquid into a molten mass under pressure, said plant comprising:

a) at least one pump for bringing said liquid to a predetermined pressure greater than the pressure of the molten mass;

b) a plurality of liquid storage tanks in fluid communication with the above-mentioned at least one pump; and c) a plurality of injectors in respective fluid communication with the above-mentioned plurality of storage tanks for injecting the liquid into the mass at an injection pressure equal to the above-mentioned predetermined pressure.

Preferably, the pump is a reciprocating positive-displacement pump comprising a plurality of pumping units in fluid communication with the above-mentioned plurality of storage tank through a respective plurality of feeding lines.

Preferably, the feeding lines are arranged in a plurality of pairs, each of such pairs of feeding lines being in fluid communication with a respective pair of pumping units of the pump and with each storage tank of the plurality of storage tanks, preferably under pressure.

For illustrative purposes, the pump may comprise six pumping units in fluid communication, through as many feeding lines preferably coupled in pairs, with three independent storage tanks under pressure in respective fluid communication with three injectors.

In accordance with a preferred embodiment, each injector comprises at least one delivery nozzle. When at least one injector comprises a plurality of delivery nozzles, the number of delivery points of the liquid into the molten mass under pressure is advantageously increased.

In accordance with a preferred embodiment of the plant of the invention, thanks to the provision of a plurality of storage tanks under pressure, the injectors may advantageously be of the mechanical type. Thanks to such feature, the plant of the invention is capable of introducing the liquid into the molten mass under pressure in a technologically simple and economically advantageous manner.

Preferably, the injectors are driven by a spring calibrated at a predetermined pressure equal to the desired injection pressure, preferably comprised between about 30 bar and about 1500 bar.

Thanks to such feature, the injectors open to introduce the liquid into the molten mass under pressure when the pressure of the liquid exceeds the above-mentioned predetermined pressure greater than the pressure to which the molten mass is subjected.

In accordance with an alternative embodiment of the plant of the invention, the above-mentioned injectors are of the electronic type, for example in the form of electrovalves. When the injectors are of the electronic type, the injectors are preferably driven by an electronic control unit.

Preferably, the above-mentioned plurality of injectors is associated with an extruder at a zone of the extruder where the mass is in molten state, i.e. already plastified, preferably in an end zone of the extruder with respect to the path of the polymer along the extruder.

Preferably, the plant of the invention comprises a plurality of injectors angularly staggered from each other. In such a way, the liquid can be introduced into the molten mass in distinct points.

Still more preferably, the plant of the invention comprises three injectors angularly staggered from each other by 120°.

Alternatively or in combination with the angular staggering of the injectors, the injectors may be longitudinally spaced apart by a predetermined distance, to be determined according to the longitudinal extension of the extruder, in particular as a function of the longitudinal extension of the portion of the extruder along which the mass is in molten state.

In accordance with a preferred embodiment, the plant of the invention further comprises, upstream of the pump, a tank for feeding the pump maintained under a predetermined pressure, preferably equal to about 1-5 bar, by means of suitable pressurisation devices, in such a way as to advantageously ensure an adequate minimum feeding pressure of the pump of the plant of the invention.

In the present description and in the subsequent claims, the terms "upstream" and "downstream" are used to indicate those parts of the plant of the invention which are firstly and, respectively, lastly passed through by the components used in the plant of the invention, i.e. by the molten mass or by the liquid to be introduced therein as the case may be.

Preferably, the plant of the invention further comprises a filter placed between the feeding tank and the pump so as to preserve the pump from undesired clogging phenomena caused by powders added to the liquid which are possibly precipitated due to insufficient heating of the liquid or due to external agents possibly present in the feeding tank, and to ensure, in this manner, the regular operation of the pump.

In accordance with a preferred embodiment, the plant of the invention further comprises, upstream of the tank for feeding the pump, a pre-loading tank provided with pressurisation devices and in fluid communication with the above-mentioned tank for feeding the pump.

In such a way, by means of a suitable loading procedure of the liquid in the tank for feeding the pump, it is advantageously possible to maintain the tank for feeding the pump constantly under pressure and thus to ensure a correct feeding of the pump. Preferably, such loading procedure of the liquid involves the steps of introducing the liquid into the pre-loading tank, closing such tank, subjecting the same to a predetermined pressure, for example comprised between about 2 and about 2.5 bar, by means of the pressurisation devices, putting the pre-loading tank in fluid communication with the tank for feeding the pump, transferring the content of the pre-loading tank to the tank for feeding the pump, interrupting the fluid communication between the two tanks, releasing the pressure of the pre-loading tank and subjecting the tank for feeding the pump to pressure, for example between about 2 and about 2.5 bar.

As an alternative to the use of the above-mentioned two tanks under pressure upstream of the pump, a pre-pump upstream of the pump which is capable of ensuring a continuous and effective feeding of the liquid to the pump may be used. Advantageously, the use of a pre-pump as an alternative to the tanks under pressure upstream of the pump allows to use tanks at atmospheric pressure which, as such, are less expensive.

In order to avoid the presence of undesired polluting external agents in the liquid entering the pre-loading tank or, in accordance with the latter alternative embodiment, entering the pre-pump, the plant preferably further comprises a filter at the inlet of the pre-loading tank or, respectively, of the pre-pump.

In accordance with a preferred embodiment, the plant further comprises heating devices in heat-exchange relationship with the at least one pump, the plurality of feeding lines, the plurality of storage tanks and the plurality of injectors and, if present, also with the pre-loading tank and the tank for feeding the pump.

For example, the tank for feeding the pump and the pre-loading tank may provided with respective jackets in which heating coils are housed, whereas the pump, the pumping units and the circuit lines and the injectors may be arranged in a thermostated environment.

BRIEF DESCRIPTION OF THE DRAWINGS

Additional features and advantages of the invention will become more readily apparent from the description of some preferred embodiments of a method for injecting a liquid into a molten mass under pressure according to the invention, made hereafter with reference to the attached drawing in which, for illustrative and not limiting purposes, a plant for carrying out said method is represented.

In the drawings.

DETAILED DESCRIPTION OF THE PREFERRED EMBODIMENTS

Figure 1:
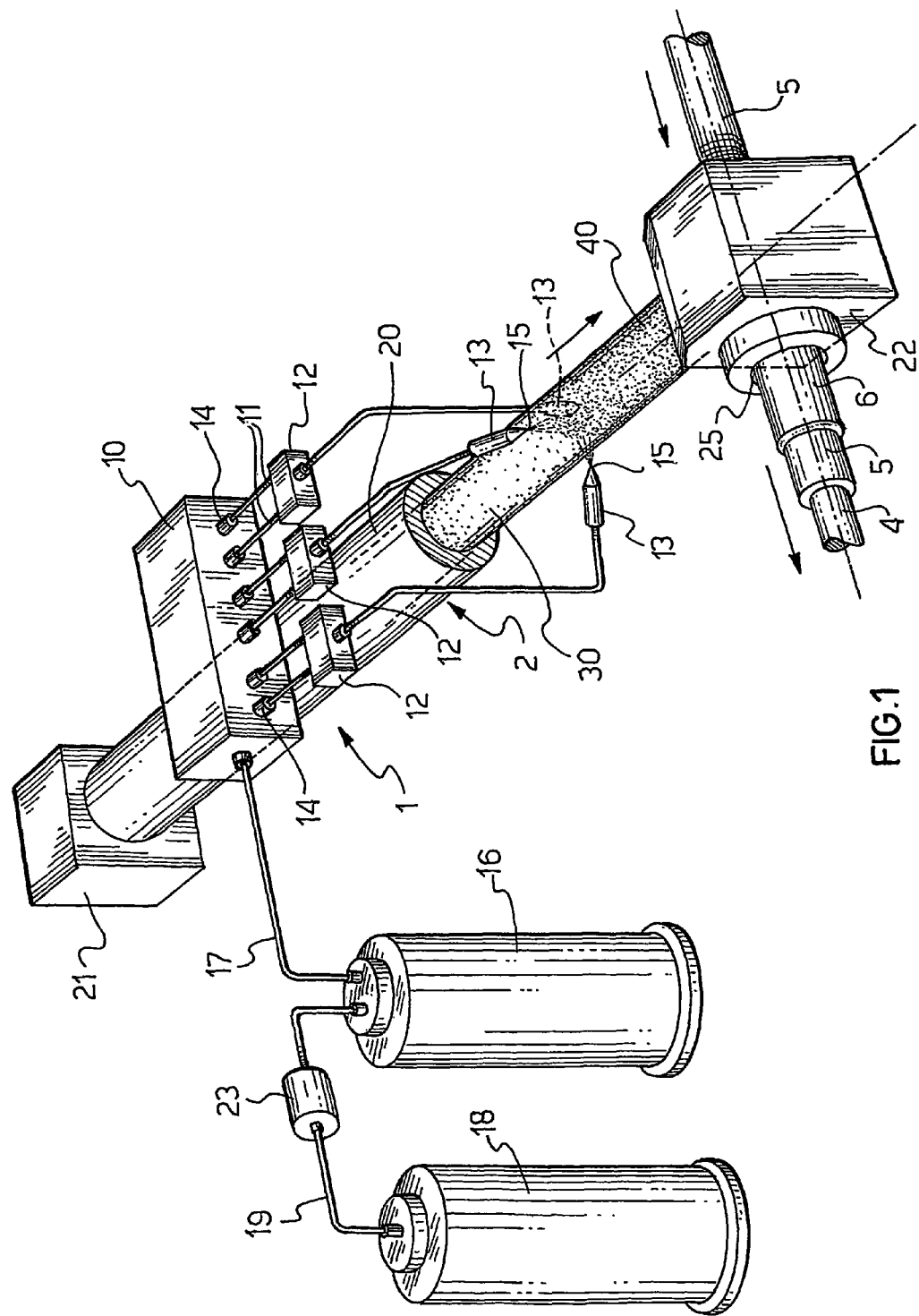
FIG. 1 is a perspective view, partially in cross-section, of a plant for injecting a liquid into a molten mass under pressure in accordance with the present invention.

With reference to the scheme of FIG. 1, a plant for the introduction of a liquid into a molten mass under pressure according to the invention is generally indicated with 1. For illustrative purposes, the plant 1, suitably associated with an extruder 2, as better described hereafter, is intended to form a coating layer of an electric cable for the transportation and/or the distribution of electrical power.

Figure 2:
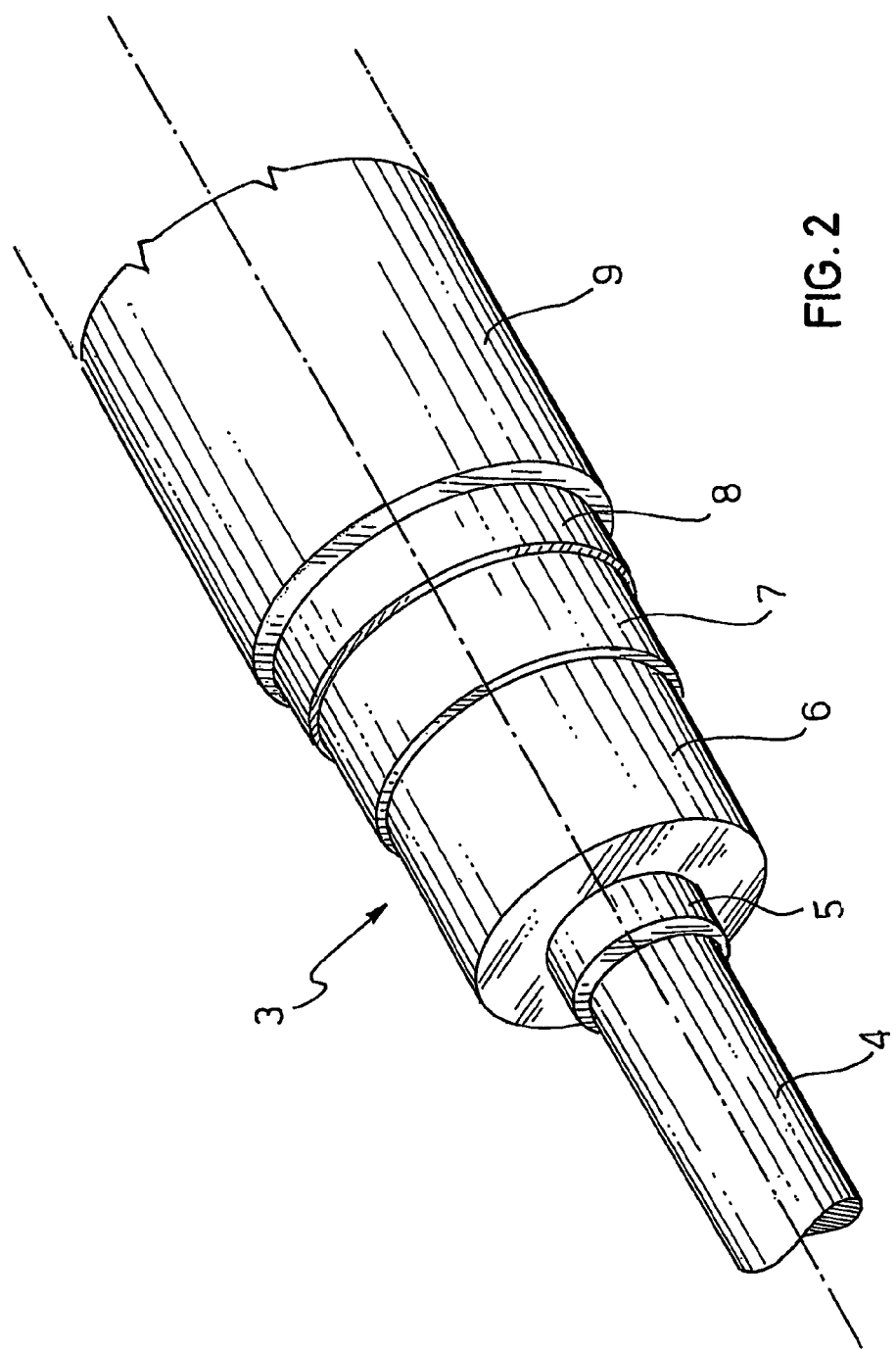
FIG. 2 is a perspective view of a cable for the transportation and/or the distribution of electrical power provided with a coating layer produced by the plant of FIG. 1.

FIG. 2 illustrates such an electric cable, generally indicated with 3, particularly suitable for medium or high voltage. In such a figure, the cable 3 comprises, from the radially innermost position to the radially outermost position, a conductor 4, a radially inner semi-conductive layer 5, an insulating layer 6, a radially outer semi-conductive layer 7, a metallic screen 8 and an outer protective sheath 9.

The conductor 4 illustrated in FIG. 2 consists of a compact metallic element (rod), preferably made of copper or aluminium. Alternatively, the conductor 4 may comprise at least two metal wires, preferably made of copper or aluminium, stranded together according to conventional techniques. The cross-sectional area of the conductor 4 is determined according to the electric current to be transported at the predetermined voltage. Preferably, for a cable for the transportation and/or the distribution of low, medium or high voltage power, such an area is comprised between 16 $mm^2$ and 1000 $mm^2$.

At least one coating layer selected from the insulating layer 6 and the radially inner 5 and radially outer 7 semi-conductive layers comprises an extruded thermoplastic polymer forming a continuous phase incorporating a dielectric liquid. In accordance with the embodiment of the cable 3 illustrated in FIG. 2, all three such layers 5, 6 and 7 essentially comprise a thermoplastic polymeric material, preferably polypropylene, containing a dielectric liquid dispersed therein, such as for example dibenzyltoluene. In addition to polypropylene and dibenzyltoluene, the radially inner 5 and radially outer 7 semi-conductive layers further contain a conductive filler, such as for example carbon black, in an amount such as to impart semi-conductive characteristics to said layers.

The screen 8 consists of an electrically conductive material arranged in a radially outer position with respect to the radially outer semi-conductive layer 7 and, in accordance with the illustrated preferred embodiment of FIG. 2, preferably consists of a continuous metallic sheet, preferably made of aluminium or, alternatively, copper, shaped in the form of a tube, the perimetric ends of which are welded or glued together in order to ensure the necessary air-tightness of the cable itself. Alternatively, the metallic screen may consist of a plurality of metal wires or metal bands helically wound in a radially outer position with respect to the outer semi-conductive layer 7.

The screen 8 is thus covered by the protective sheath 9, preferably consisting of a thermoplastic material, such as for example non-cross-linked polyethylene (PE).

The cable 3 may also be provided with a protective structure arranged in a radially inner position with respect to the protective sheath 9, not shown in FIG. 2, intended to carry out the main function of mechanically protecting the cable 3 from impacts and/or compressions. Such protective structure, for example, may be either a metal armour or a layer of expanded polymeric material as described in patent application WO 98/52197.

With reference to the plant 1 for the injection of a liquid into a molten mass under pressure, for purely illustrative purposes this shall be described hereafter with reference to the injection of a dielectric liquid, such as for example dibenzyltoluene, into a molten mass under pressure, such as for example polypropylene, intended to form the insulating layer 6 of the electric cable 3 shown in FIG. 2.

In accordance with the invention, the plant 1 comprises a pump, schematically illustrated and indicated with 10, for bringing the liquid to a predetermined pressure greater than the pressure of the molten mass. When the molten mass is subjected to a pressure comprised between about 100 bar and about 600 bar, the liquid is preferably brought to a pressure comprised between about 200 bar and about 700 bar.

Furthermore, in accordance with the invention, the plant 1 further comprises a plurality of liquid storage tanks 12—said storage tanks being under pressure and in fluid communication with the pump 10—and a plurality of injectors 13 in respective fluid communication with the plurality of storage tanks 12 for injecting the liquid into the mass at an injection pressure equal to the above-mentioned predetermined pressure, i.e. equal, for example, to about 200-700 bar.

The liquid may be advantageously injected at such injection pressure values or at greater values—in any case greater than the pressure to which the molten mass is subjected— thanks to the provision of the storage tanks 12 under pressure, which advantageously constitute a reservoir of liquid under pressure.

In accordance with the preferred embodiment illustrated in FIG. 1, the pump 10 is a reciprocating positive-displacement pump comprising a plurality of pumping units 14, in the illustrated embodiment in number of six, arranged in three pairs which are in fluid communication, through six feeding lines 11 correspondingly arranged in three pairs, with three storage tanks 12 connected to three respective injectors 13. Each pumping unit 14 comprises, in a way conventional per se: a) a piston, not shown, the movement of which is determined by a cam integral with the shaft of the pump 10; b) a suction port, not shown, the size of which is suitably adjustable; and c) a delivery port, not shown, of predetermined size.

The pump 10 is capable of pumping the liquid at a predetermined pressure, for example comprised between about 200 bar and about 700 bar, and at a flow rate comprised between about 0.5 kg/h and about 100 kg/h.

In accordance with the preferred embodiment of FIG. 1, the injectors 13 are of the mechanical type. Each injector 13 comprises at least one delivery nozzle 15 for injecting the dielectric liquid into the molten mass under pressure.

Preferably, the injectors 13 are driven by a spring—conventional per se and not illustrated—calibrated at a predetermined pressure equal to the above-mentioned injection pressure so as to drive the opening of the injectors 13 once such a predetermined pressure has been exceeded.

As illustrated in FIG. 1, in order to produce the insulating layer 6 of the electric cable 3 of FIG. 2, the three injectors 13 are arranged in such a way as to inject the liquid into the extruder 2 in a zone thereof where the polymeric mass is in molten state, i.e. is already plastified. For such a purpose, as schematised in FIG. 1, the three injectors 13 are arranged in an end zone of the extruder 2 with reference to the path of the molten mass along the extruder 2, preferably angularly staggered by 120° from each other.

In accordance with the illustrated preferred embodiment of the plant 1, the latter further comprises, upstream of the pump 10, a tank 16 for feeding the pump 10 maintained at a predetermined pressure, for example equal to about 1-5 bar, by means of the use of suitable pressurisation devices (such as for example a conventional nitrogen cylinder), and in fluid communication with the pump 10 through a line 17 for feeding the liquid.

Furthermore, the plant 1 preferably further comprises a filter, conventional per se and not shown, placed between the feeding tank 16 and the pump 10.

The plant 1, in the embodiment illustrated in FIG. 1, further comprises, upstream of the feeding tank 16, a pre-loading tank 18 in fluid communication with the feeding tank 16 through a connection line 19 provided with an intercepting valve 23.

In order to avoid the passage of undesired substances, such as polluting external agents, at the inlet of the pre-loading tank 18 a filter, conventional per se and not shown, is arranged.

Preferably, each of the above-mentioned components of the plant 1 of the invention is in heat-exchange relationship with suitable heating devices, conventional per se and not shown, intended to heat the liquid along the circuit of the plant 1 in order to avoid undesired precipitations of the anti-oxidants normally added to the dielectric liquid which could clog the pre-loading tank 18 and/or the tank 16 for feeding the pump 10 and/or the pump 10 and/or the feeding lines 11 and/or the injectors 13.

For example, the tank 16 for feeding the pump 10 and the pre-loading tank 18 may be provided with respective jackets in which heating coils, not shown, are housed, whereas the pump 10, the pumping units 14, the circuit lines 11 and the injectors 13 may be housed in a thermostated chamber, conventional per se and not shown.

The extruder 2, conventional per se, is illustrated in a schematic way and partially in section in order to schematically show the material being extruded, generally indicated with 30, received in the extruder portion 2 upstream of the injectors 13, as well as the material being extruded already subjected to injection of the dielectric liquid, generally indicated with 40, which material is received in the extruder portion downstream of the injectors 13.

In particular, the extruder 2 comprises a substantially cylindrical body 20 within which, by means of a suitable motor means 21 a screw, not shown, is rotated, intended to process and plastify a polymeric mass subjected to a pressure, for example comprised between about 100 bar and about 600 bar.

The extruder 2 also comprises a hopper, also not shown, for feeding the polymeric material into the extruder 2 itself, and an extrusion head 22 in output from which, in accordance with the illustrated embodiment, the insulating layer 6 of the electric cable 3 is obtained. In the illustrated preferred embodiment, the extrusion head 22 is provided with a channel 25 intended to receive the conductor 4 coated by the inner semi-conductive layer 5. Said channel 25 is arranged in a direction substantially perpendicular to the longitudinal direction of the extruder 2, i.e. perpendicularly to the conveying direction of the mass in the extruder 2.

With reference to the plant described above, a first embodiment of the method according to the invention for the introduction of a liquid into a molten mass under pressure involves the following steps.

In order to avoid the undesired entry of polluting external agents, the liquid is preferably preliminarily filtered at the inlet of the pre-loading tank 18, whereas in order to allow the melting of possible solid additives, for example having an anti-oxidant function, added to the liquid and in order to avoid an undesired precipitation thereof, the liquid is preferably maintained at a predetermined temperature, for example between about 70° C. and about 80° C., by means of the above-mentioned heating coils provided in the jackets of the tank 16 for feeding the pump 10 and of the pre-loading tank 18 and by means of the above-mentioned thermostated chamber housing the pump 10, the pumping units 14, the circuit lines 11 and the injectors 13.

Preliminarily to the steps of the method of the invention, furthermore, the following loading procedure of the liquid into the plant 1 is preferably carried out, which procedure is aimed at ensuring an adequate minimum feeding pressure at the inlet of the pump 10. After having introduced the liquid into the pre-loading tank 18, this is closed and subjected to a predetermined pressure, for example between about 2 and about 2.5 bar. Subsequently, the pre-loading tank 18 is put in fluid communication with the tank 16 for feeding the pump 10 by opening the intercepting valve 23. The content of the pre-loading tank 18 is transferred to the tank 16 for feeding the pump 10, the fluid communication between the two tanks 18 and 16 is interrupted by closing the intercepting valve 23, the pressure of the pre-loading tank 18 is released and the tank 16 for feeding the pump 10 is subjected to a pressure for example comprised between about 2 and 2.5 bar.

In a first step of the method of the invention, the liquid is brought to a predetermined pressure, for example between about 200 bar and about 700 bar, by means of the pump 10, and in particular by means of the pumping units 14 thereof.

In a second step of the method of the invention, the liquid is fed to the three storage tanks 12 under pressure through the six feeding lines 11.

More particularly, in accordance with the preferred embodiment illustrated in FIG. 1, the liquid is fed to each storage tank 12 under pressure through a pair of feeding lines 11. The liquid fed to the storage tanks 12 is stored therein.

Thanks to the fact that the pressure generated by the pump 10 is stored in the plurality of storage tanks 12 under pressure, the step of forming the pressure of the liquid and the step of injecting the liquid are made advantageously independent. Thanks to the independence of the step of forming the pressure of the liquid with respect to the step of injecting the liquid, both the pressure oscillations deriving from the pumping of the pump 10, and the oscillations deriving from the opening of the injectors 13 are advantageously dampened, thus allowing, as described better hereafter, to inject the stored liquid at a high pressure.

In a further step of the method of the invention, the liquid is injected into the molten mass under pressure at an injection pressure greater than the pressure of the mass, and in particular at an injection pressure preferably comprised between about 200 bar and about 700 bar, by means of the plurality of injectors 13 and thanks to the above-mentioned springs calibrated at a pressure comprised within such a range of preferred values.

Thanks to the provision of the plurality of storage tanks 12 and the provision of the respective plurality of injectors 13, the injectors 13 are also made advantageously independent from each other, which allows to ensure a substantially continuous delivery of liquid to at least one injector 13 and a substantially continuous metering of the liquid within the molten mass while maintaining the above-mentioned high pressure values without the need of using complicated and expensive electronic driving devices.

Subsequently to the above-mentioned step of injecting the liquid into the molten mass under pressure, thanks to the presence of the screw of the extruder 2, the liquid is mixed with the mass and the mass incorporating the liquid mixed therein is extruded onto the inner semi-conductive layer 5, the cable produced so far—comprising the conductor 4 and the inner semi-conductive layer 5—being preliminarily conveyed along the channel 25 of the extrusion head 22.

In accordance with the illustrated example, the method of the invention therefore allows to form the insulating layer 6 onto the radially inner semi-conductive layer 5 of the electric cable 3 in a substantially continuous manner.

Subsequently, the method of the invention may also be carried out to form the radially outer semi-conductive layer 7 onto the insulating layer 6 of the electric cable element 3 obtained so far.

The electric cable 3 of FIG. 2 is then completed by providing the metallic screen 8 and the outer sheath 9 according to conventional operative ways which, as such, are not described in detail.

For illustrative purposes, in accordance with the method of the invention described above, an insulating coating layer made of polypropylene (in particular HIFAX 7320 XEP supplied by Basell S.p.A.) incorporating dibenzyltoluene in a proportion equal to 6% was produced in a substantially continuous manner. The cable comprised a conductive element made of copper having a cross-sectional area equal to about 150 mm$^2$ and a radially inner semi-conductive layer made of polymeric polypropylene based material having a thickness equal to about 0.5 mm.

The above-mentioned insulating layer was produced at a rate of about 3 m/min by injecting dibenzyltoluene into the extruder, in which a mass of molten polypropylene at about 200 bar was received, by means of three injectors at a flow rate of about 60 g/min and at an injection pressure of about 300 bar. In order to obtain such values of flow rate and injection pressure of the dielectric liquid, a 90 cc reciprocating positive-displacement pump, having 6 pumping units, set at 340 rpm, was used.

The extruder used to make the insulating layer had a cylinder diameter equal to 45 mm and a L/D ratio (length/diameter) equal to 20. The number of revolutions of the screw of the extruder was equal to 44.4 rpm.

The thickness of the insulator thus obtained was equal to 4.5 mm.

The invention claimed is:

1. A method for the introduction of a liquid into a molten mass under pressure, comprising the steps of:
   (a) bringing said liquid to a predetermined pressure greater than the pressure of said molten mass by means of at least one pump, the pump comprising a plurality of pumping units, staggering the pumping units in such a manner that the liquid is pumped by the different pumping units at distinct moments in order to effect continuous and uniform delivery of said liquid;
   (b) feeding said liquid to a plurality of storage tanks, each storage tank being in fluid communication with at least a pair of the pumping units via at least a pair of respective feeding lines, and
   (c) continuously injecting said liquid into said mass at an injection pressure equal to said predetermined pressure by means of a plurality of injectors independent from each other in respective fluid communication with said plurality of storage tanks, in order to introduce said liquid into the molten mass without appreciable interruptions.

2. The method according to claim 1, wherein the ratio by weight between said liquid and said molten mass is 1:99 to 25:75.

3. The method according to claim 1, wherein said liquid is a dielectric liquid.

4. The method according to claim 1, wherein said molten mass comprises at least one thermoplastic polymer.

5. The method according to claim 4, wherein said thermoplastic polymer comprises at least one polyolefin.

6. The method according to claim 1, wherein the pressure of the molten mass is about 10 bar to about 1400 bar.

7. The method according to claim 1, wherein said predetermined pressure to which said liquid is brought and at which said liquid is injected is 30-1500 bar.

8. The method according to claim 1, wherein said pump is a reciprocating positive-displacement pump.

9. The method according to claim 1, wherein said step c) of injecting the liquid is driven mechanically.

10. The method according to claim 1, wherein said step c) of injecting the liquid is carried out into an extruder within which said molten mass is received.

11. The method according to claim 10, further comprising the step of mixing said liquid with said molten mass within said extruder.

12. The method according to claim 10, wherein said extruder is capable of extruding a layer of molten mass onto an electric cable element for the transportation and/or the distribution of electrical power, said electric cable element comprising at least one conductive element.

13. The method according to claim 12, wherein said step c) of injecting the liquid is carried out at a plurality of injection points angularly staggered by a predetermined angle in a zone of the extruder in which said mass is in a molten state.

14. The method according to claim 12, wherein said step c) of injecting the liquid is carried out at a plurality of injection points longitudinally staggered by a predetermined distance in a zone of the extruder in which the mass is in a molten state.

15. The method according to claim 1, further comprising the preliminary step of filtering said liquid.

16. The method according to claim 1, further comprising the step of maintaining said liquid at a predetermined temperature.

* * * * *